United States Patent
Enomoto et al.

(10) Patent No.: US 10,550,548 B2
(45) Date of Patent: Feb. 4, 2020

(54) WHEEL LOADER, METHOD FOR CONTROLLING WHEEL LOADER, AND SYSTEM FOR CONTROLLING WHEEL LOADER

(71) Applicant: KOMATSU LTD., Minato-ku, Tokyo (JP)

(72) Inventors: Ryota Enomoto, Tokyo (JP); Masanori Ikari, Tokyo (JP); Kentaro Yajima, Tokyo (JP); Takuma Nishimura, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 16/087,761

(22) PCT Filed: Aug. 10, 2017

(86) PCT No.: PCT/JP2017/029102
§ 371 (c)(1),
(2) Date: Sep. 24, 2018

(87) PCT Pub. No.: WO2018/037935
PCT Pub. Date: Mar. 1, 2018

(65) Prior Publication Data
US 2019/0112788 A1    Apr. 18, 2019

(30) Foreign Application Priority Data

Aug. 26, 2016 (JP) .................................. 2016-165741

(51) Int. Cl.
*F16D 48/02* (2006.01)
*E02F 9/22* (2006.01)
*F16H 61/68* (2006.01)

(52) U.S. Cl.
CPC .......... *E02F 9/2246* (2013.01); *E02F 9/2203* (2013.01); *F16D 48/02* (2013.01); *F16H 61/68* (2013.01); *B60Y 2200/415* (2013.01)

(58) Field of Classification Search
CPC ........ F16D 48/02; F16D 48/06; F16D 48/066; F16D 2500/104; F16D 2500/3101;
(Continued)

(56) References Cited

U.S. PATENT DOCUMENTS 3,656,600 A * 4/1972 Kitano .................... F16D 25/14
477/171
5,913,748 A * 6/1999 Takiguchi ............. F16H 61/061
477/148
(Continued)

FOREIGN PATENT DOCUMENTS

CN    101287876 A    10/2008
CN    101821457 A     9/2010
(Continued)

*Primary Examiner* — Edwin A Young
(74) *Attorney, Agent, or Firm* — Drinker Biddle & Reath LLP (57) ABSTRACT

A wheel loader includes a forward clutch, an accelerator pedal, a brake pedal, and a controller configured to control hydraulic pressure of hydraulic oil supplied to the forward clutch. The controller performs clutch hydraulic pressure control for reducing the hydraulic pressure of the hydraulic oil supplied to the forward clutch according to an operation amount of the brake pedal on condition that at least the brake pedal is operated while the accelerator pedal is being operated. The controller continues the clutch hydraulic pressure control even after the clutch shifts from a complete engagement state to a semi-engagement state by the clutch hydraulic pressure control.

17 Claims, 6 Drawing Sheets

(58) Field of Classification Search
CPC . F16D 2500/31426; F16D 2500/31433; F16D 2500/3144; F16D 2500/31453
See application file for complete search history.

(56) References Cited

U.S. PATENT DOCUMENTS

| | | |
|---|---|---|
| 6,162,146 A | 12/2000 | Hoefling |
| 2009/0111655 A1 | 4/2009 | Hatanaka |
| 2010/0131158 A1 | 5/2010 | Saito |
| 2011/0004378 A1 | 1/2011 | Saito |
| 2012/0245805 A1 | 9/2012 | Yamaguchi et al. |
| 2013/0304339 A1* | 11/2013 | Shattuck ................ F16D 48/06 701/68 |
| 2014/0288787 A1 | 9/2014 | Hyodo et al. |

FOREIGN PATENT DOCUMENTS

| | | |
|---|---|---|
| CN | 102667258 A | 9/2012 |
| CN | 103946577 A | 7/2014 |
| EP | 2444634 A1 | 4/2012 |
| EP | 2949822 A1 | 12/2015 |
| JP | S61-218837 A | 9/1986 |
| JP | 2519801 Y2 | 12/1996 |
| JP | 2008-232161 A | 10/2008 |
| JP | 2013-104509 A | 5/2013 |
| WO | WO-2007/043290 A1 | 4/2007 |
| WO | WO-2009/116248 A1 | 9/2009 |

\* cited by examiner

FIG.6

WHEEL LOADER, METHOD FOR CONTROLLING WHEEL LOADER, AND SYSTEM FOR CONTROLLING WHEEL LOADER

TECHNICAL FIELD

The present invention relates to a wheel loader, a method for controlling the wheel loader, and a system for controlling the wheel loader.

BACKGROUND ART

A wheel loader that is a self-propelled work vehicle includes a traveling apparatus that causes a vehicle to travel and a work implement that performs various operations such as excavation. The traveling apparatus and the work implement are driven by driving force from an engine.

An operator of the wheel loader simultaneously operates an accelerator pedal and a boom lever at the same time when soil scooped by a bucket of the work implement is loaded on a cargo box of a dump truck. Consequently, the wheel loader advances and performs boom raising. A loading operation is also referred to as "dump approach".

In the loading operation, when a distance between the wheel loader and the dump truck is insufficient, the wheel loader may arrive in front of the dump truck before the bucket is raised higher than the cargo box of the dump truck. For this reason, the operator adjusts time until the wheel loader arrives near the dump truck by operating not only the accelerator pedal but also the brake pedal in consideration of time necessary for the raising of the boom.

WO 2009/116248 (PTL 1) discloses a work vehicle including a modulation clutch connected to a distributor that distributes output from the engine into a traveling system and a hydraulic device system. When the loading operation is detected, the work vehicle performs control for reducing hydraulic pressure of the modulation clutch. In particular, the work vehicle controls the hydraulic pressure of the modulation clutch according to an operation amount of the boom lever and an operation amount of the accelerator when the loading operation is detected.

U.S. Pat. No. 6,162,146 (PTL 2) discloses a technique relating to a drive train (powertrain) of the work vehicle such as the wheel loader. The work vehicle of U.S. Pat. No. 6,162,146 has a pressable right pedal that selectively controls torque associated with the powertrain. The work vehicle controls pressure of a selected direction switching clutch according to a pressing amount (position) of the right pedal.

CITATION LIST

Patent Literature

PTL 1: WO 2009/116248
PTL 2: U.S. Pat. No. 6,162,146

SUMMARY OF INVENTION

Technical Problem

Installation of the modulation clutch disclosed in PTL 1 and the right pedal disclosed in PTL 2 require cost and space. Additionally, an increase in wear amount of the brake component (typically, a brake pad) and reduction of fuel consumption are caused when the accelerator pedal and the brake pedal are simultaneously operated in the loading operation (dump approach).

Consequently, in the wheel loader that does not include hardware such as the modulation clutch, when the increase in wear amount of the brake part and the reduction of the fuel consumption are prevented in simultaneously operating the brake pedal and the accelerator pedal, operation efficiency can be improved without the cost increase necessary for the installation of the hardware.

The present disclosure has been made in view of the above problems, and an object of the present disclosure is to provide a wheel loader capable of improving the operation efficiency when the brake pedal is operated while an accelerator pedal is being operated, a method for controlling the wheel loader control method, and a system for controlling the wheel loader.

Solution to Problem

According to an aspect of the present disclosure, a wheel loader includes a forward or speed stage clutch, an accelerator pedal, a brake pedal configured to operate a hydraulic brake, a controller configured to control hydraulic pressure of hydraulic oil supplied to the clutch. The controller performs clutch hydraulic pressure control for reducing the hydraulic pressure of the hydraulic oil supplied to the clutch according to one of an operation amount of the brake pedal and pressure of the hydraulic oil of the brake on condition that the brake pedal is operated while at least the accelerator pedal is being operated. The controller continues the clutch hydraulic pressure control even after the clutch shifts from a complete engagement state to a semi-engagement state by the clutch hydraulic pressure control.

Advantageous Effects of Invention

According to the present disclosure, the operation efficiency can be improved when the brake pedal is operated while the accelerator pedal is being operated.

DESCRIPTION OF EMBODIMENTS

Hereinafter, an embodiment will be described with reference to the drawings. It is planned from the beginning that structures in the embodiment are used while combined as appropriate. Some components may not be used.

A wheel loader will be described below with reference to the drawings. In the following description, "upper", "lower", "front", "rear", "left" and "right" are terms based on an operator seated in a driver's seat.

A. ENTIRE CONFIGURATION

Figure 1:
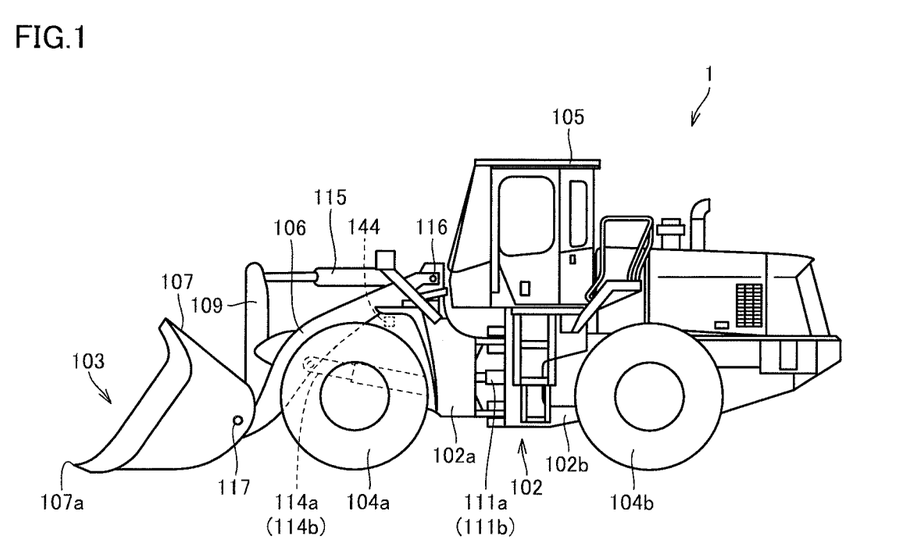
FIG. 1 is an external view of a wheel loader.

FIG. 1 is an external view of a wheel loader 1 according to an embodiment. As illustrated in FIG. 1, wheel loader 1 includes a vehicular body 102, a work implement 103, wheels 104a, 104b, and an operator's cab 105. Wheel loader 1 can be self-propelled by rotationally driving wheels 104a, 104b, and can perform desired operation using work implement 103.

Vehicular body 102 includes a front vehicular body unit 102a and a rear vehicular body unit 102b. Front vehicular body unit 102a and rear vehicular body unit 102b are connected to each other so as to be able to swing in left and right directions.

A pair of steering cylinders 111a, 111b are provided across front vehicular body unit 102a and rear vehicular body unit 102b. Steering cylinders 111a, 111b are hydraulic cylinders driven by hydraulic oil from a steering pump (not illustrated). Steering cylinders 111a, 111b expand and contract, whereby front vehicular body unit 102a swings with respect to rear vehicular body unit 102b. Consequently, a traveling direction of wheel loader 1 is changed.

In FIG. 1, only one of the steering cylinders 111a, 111b is illustrated, and the other is omitted.

Work implement 103 and a pair of front wheels 104a are attached to the front vehicular body unit 102a. Work implement 103 is disposed in front of the vehicular body 102. Work implement 103 is driven by the hydraulic oil from a hydraulic pump 8 (see FIG. 2). Work implement 103 includes a boom 106, a pair of lift cylinders 114a, 114b, a bucket 107, a bell crank 109, and a tilt cylinder 115.

Boom 106 is rotatably supported by front vehicular body unit 102a. A proximal end of boom 106 is swingably attached to front vehicular body unit 102a by a boom pin 116. One end of each of lift cylinders 114a, 114b is attached to front vehicular body unit 102a. The other end of each of lift cylinders 114a, 114b is attached to boom 106. Front vehicular body unit 102a and boom 106 are coupled to each other by lift cylinders 114a, 114b. Lift cylinders 114a, 114b expand and contract by the hydraulic oil from hydraulic pump 8, whereby boom 106 swings vertically about boom pin 116.

In FIG. 1, only one of lift cylinders 114a, 114b is illustrated, and the other is omitted.

Bucket 107 is rotatably supported at a distal end of boom 106. Bucket 107 is swingably instructed at the distal end of boom 106 by bucket pin 117. One end of tilt cylinder 115 is attached to front vehicular body unit 102a. The other end of tilt cylinder 115 is attached to bell crank 109. Bell crank 109 and bucket 107 are coupled to each other by a link device (not illustrated). Front vehicular body unit 102a and bucket 107 are coupled to each other by tilt cylinder 115, bell crank 109, and the link device. Tilt cylinder 115 expands and contracts by the hydraulic oil from hydraulic pump 8, whereby bucket 107 swings vertically about bucket pin 117.

Operator's cab 105 and a pair of rear wheels 104b are attached to rear vehicular body unit 102b. Operator's cab 105 is mounted on vehicular body 102. A seat on which the operator is seated, and an operating device (to be described later) are installed in operator's cab 105.

An angle sensor 144 (to be described in detail later) is provided in front vehicular body unit 102a.

B. SYSTEM CONFIGURATION

Figure 2:
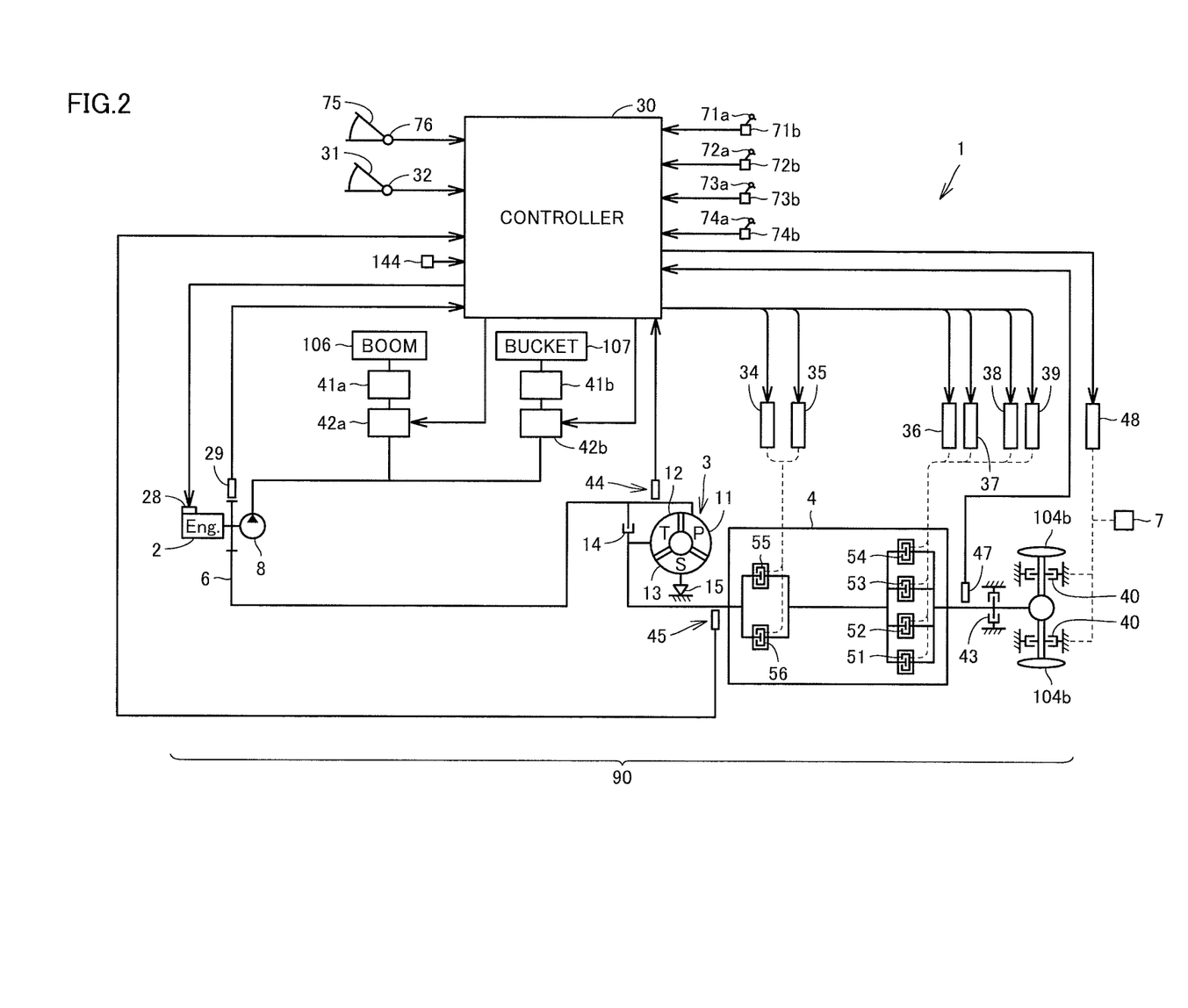
FIG. 2 is a schematic diagram illustrating a configuration of the wheel loader.

FIG. 2 is a schematic diagram illustrating a configuration of wheel loader 1. As illustrated in FIG. 2, a transfer 6, a torque converter 3, a transmission 4, a parking brake 43, and a service brake 40 are provided in a driving force transmission path 90 from an engine 2 to wheel 104b.

An output shaft of engine 2 is coupled to transfer 6. Transfer 6 is coupled to hydraulic pump 8.

An engine rotation speed sensor 29 that detects a rotation speed Ne of an output shaft is provided on the output shaft of engine 2. Engine rotation speed sensor 29 transmits a detection signal indicating rotation speed Ne to a controller 30.

Part of the output of engine 2 is transmitted to wheel 104b through transfer 6, torque converter 3, and transmission 4. Consequently, wheel loader 1 travels. A traveling speed Vt of wheel loader 1 can be controlled by an accelerator pedal 31 provided in operator's cab 105. When the operator presses down on accelerator pedal 31, an accelerator operation amount sensor 32 transmits a detection signal indicating a pressing operation amount of accelerator pedal 31 to controller 30.

The rest of the output of engine 2 is transmitted to hydraulic pump 8 through transfer 6. Consequently, hydraulic pump 8 is driven. Hydraulic pump 8 supplies hydraulic oil to a hydraulic actuator 41a that drives boom 106 through an operation valve 42a. Vertical movement of boom 106 can be controlled by operating a boom control lever 71a provided in operator's cab 105. Hydraulic pump 8 also supplies the hydraulic oil to a hydraulic actuator 41b that drives bucket 107 through an operation valve 42b. Action of bucket 107 can be controlled by operating a bucket control lever 72a provided in operator's cab 105.

As described above, wheel loader 1 can repeatedly perform a series of operations such as excavation, backward movement, dump approach, soil ejection, and backward movement using the output of engine 2. Among these operations, in the dump approach, action of moving forward work implement 103 at a small speed toward a dump truck 900 while raising work implement 103 loaded with soil is performed.

Torque converter 3 is provided between transfer 6 and transmission 4. Torque converter 3 includes a pump impeller 11, a turbine runner 12, a stator 13, a lock-up clutch 14, and a one-way clutch 15. Pump impeller 11 is coupled to engine 2. Turbine runner 12 is coupled to transmission 4. Stator 13 is a reaction element provided between pump impeller 11 and turbine runner 12. Lock-up clutch 14 freely connects and disconnects the power transmission between pump impeller 11 and engine 2 by engaging and disengaging (in a neutral state) pump impeller 11 and turbine runner 12. Lock-up clutch 14 is hydraulically operated. One-way clutch 15 allows the rotation of stator 13 in only one direction.

A torque converter input rotation speed sensor 44 that detects a rotation speed Nc of pump impeller 11 is provided in pump impeller 11 of torque converter 3. Torque converter input rotation speed sensor 44 transmits a detection signal indicating rotation speed Nc to controller 30.

Transmission 4 includes a forward clutch 55 corresponding to a forward traveling stage and a reverse clutch 56 corresponding to a reverse traveling stage. Transmission 4 includes a first speed clutch 51, a second speed clutch 52, a third speed clutch 53, and a fourth speed clutch 54 corresponding to the first to fourth speed stages, respectively. Forward clutch 55 and reverse clutch 56 are a direction switching clutch, and first to fourth speed clutches 51 to 54 are a speed switching clutch. Each of clutches 51 to 56 is constructed with a wet multiplate hydraulic clutch. Transmission 4 selectively engages and disengages respective clutches 51 to 56 according to the traveling direction of the wheel loader, the necessary driving force, and necessary traveling speed Vt.

Engagement pressure between an input side and an output side of each of clutches 51 to 56 of transmission 4 can be controlled by the hydraulic pressure of the hydraulic oil supplied to each of clutches 51 to 56. In the embodiment, each of clutch 51 to 56 shifts from disengagement, through semi-engagement, to complete engagement as the hydraulic pressure of the supplied hydraulic oil increases. Clutch control valves 34 to 39 adjust clutch hydraulic pressures supplied to clutch control valves 34 to 39 according to clutch hydraulic pressure instruction signals transmitted from controller 30 to clutch control valves 34 to 39, respectively, thereby controlling the engagement pressures of clutches 51 to 56. Each of clutch control valves 34 to 39 is an electronic control type proportional solenoid valve.

A transmission input shaft rotation speed sensor 45 that detects a rotation speed Nt0 of the input shaft is provided on the input shaft of transmission 4. Transmission input shaft rotation speed sensor 45 transmits a detection signal indicating rotation speed Nt0 to controller 30.

A transmission output shaft rotation speed sensor 47 that detects a rotation speed Nt2 of the output shaft is provided on the output shaft of transmission 4. Transmission output shaft rotation speed sensor 47 transmits a detection signal indicating rotation speed Nt2 to controller 30.

Parking brake 43 is disposed between transmission 4 and service brake 40. Parking brake 43 is attached to the output shaft. Parking brake 43 is a negative brake that mainly parks the wheel loader. Parking brake 43 is a wet multiplate brake that can switch between a braking state and a non-braking state. The engagement pressure of parking brake 43 can be adjusted by an operation amount of a parking brake lever disposed in the driver's seat.

Service brake 40 is disposed between parking brake 43 and wheel 104b. Service brake 40 is attached to an axle coupled to wheel 104b. Service brake 40 is a brake that is mainly used to decelerate or stop during traveling. Service brake 40 is a so-called positive brake of a wet multiplate type that can switch between the braking state and the non-braking state. A brake control valve 48 adjusts brake hydraulic pressure supplied to service brake 40 according to a brake hydraulic pressure instruction signal transmitted from controller 30 to brake control valve 48, thereby controlling the engagement pressure (that is, braking force) of service brake 40.

The controller 30 adjusts an accelerator opening degree based on the detection signal from accelerator operation amount sensor 32, and transmits a fuel injection amount instruction signal to an electronic control type fuel injector 28. Electronic control type fuel injector 28 determines the injection amount instruction signal, adjusts a fuel injection amount injected into a cylinder, and controls the output (rotation speed) of engine 2. Accelerator operation amount sensor 32 is also referred to as an accelerator opening degree sensor.

When boom control lever 71a is operated, a boom operation detector 71b transmits a boom operation signal based on the operation to controller 30. In response to the boom operation signal, controller 30 transmits a boom hydraulic pressure instruction signal to operation valve 42a. Operation valve 42a determines the boom hydraulic pressure instruction signal, and controls an amount of the hydraulic oil supplied from hydraulic pump 8 to hydraulic actuator 41a. An action speed of boom 106 is adjusted by adjusting the operation amount of boom control lever 71a.

When bucket control lever 72a is operated, bucket operation detector 72b transmits a bucket operation signal based on the operation to controller 30. Controller 30 transmits a bucket hydraulic pressure instruction signal to operation valve 42b according to the bucket operation signal. Operation valve 42b determines the bucket hydraulic pressure instruction signal, and controls an amount of the hydraulic oil supplied from hydraulic pump 8 to hydraulic actuator 41b. The operation speed of bucket 107 is adjusted by adjusting the operation amount of bucket control lever 72a.

When a forward and reverse switching lever 73a is operated, a forward and reverse switching detector 73b transmits a forward and reverse switching operation signal corresponding to an operation position of forward and reverse switching lever 73a to controller 30. Controller 30 transmits a clutch hydraulic pressure instruction signal to forward and reverse clutch control valves 34, 35 according to the forward and reverse switching operation signal. Forward and reverse clutch control valves 34, 35 determine the clutch hydraulic pressure instruction signal, and cause one of the forward clutch 55 and the reverse clutch 56 to engage.

When a speed change lever 74a is operated, a speed change detector 74b transmits a speed change switching operation signal corresponding to the operation position of speed change lever 74a to controller 30. Controller 30 transmits the clutch hydraulic pressure instruction signal to each of speed change clutch control valves 36 to 39 in response to the speed change switching operation signal. Each of speed change clutch control valves 36 to 39 determines the clutch hydraulic pressure instruction signal, and causes any one of the speed stage clutches (speed change clutches) 51 to 54 of the transmission 4 to engage.

When the operator presses down on a brake pedal 75, a brake operation amount sensor 76 transmits a detection signal indicating a pressing operation amount of brake pedal 75 to controller 30.

Controller 30 transmits the brake hydraulic pressure instruction signal to brake control valve 48 according to the pressing operation amount of brake pedal 75. Brake control valve 48 determines the brake hydraulic pressure instruction signal, and controls the engagement pressure of service brake 40 by adjusting the brake hydraulic pressure supplied to service brake 40.

Controller 30 is connected to an angle sensor 144 that detects inclination of vehicular body 102. As illustrated in FIG. 1, angle sensor 144 is provided in front vehicular body unit 102a. Angle sensor 144 detects a pitch angle of vehicular body 102, and inputs a detection signal to controller 30. Hereinafter, a direction around the axis, which passes through a center of gravity of wheel loader 1 and extends in the right and left direction, is referred to as a pitch direction. The pitch direction is a direction in which a front end of vehicular body 102 drops or rises with respect to the center of gravity of vehicular body 102. The pitch angle is an inclination angle of vehicular body 102 in the pitch direction. The pitch angle is an inclination angle in a fore/aft direction of vehicular body 102 with respect to a reference surface such as a perpendicular direction or a horizontal direction. A method for using angle sensor 144 will be described later.

Controller 30 is connected to a pressure sensor 7 that detects pressure of the hydraulic oil of service brake 40. A method for using a detection result of pressure sensor 7 will be described later.

C. OUTLINE OF DUMP APPROACH

Figure 3:
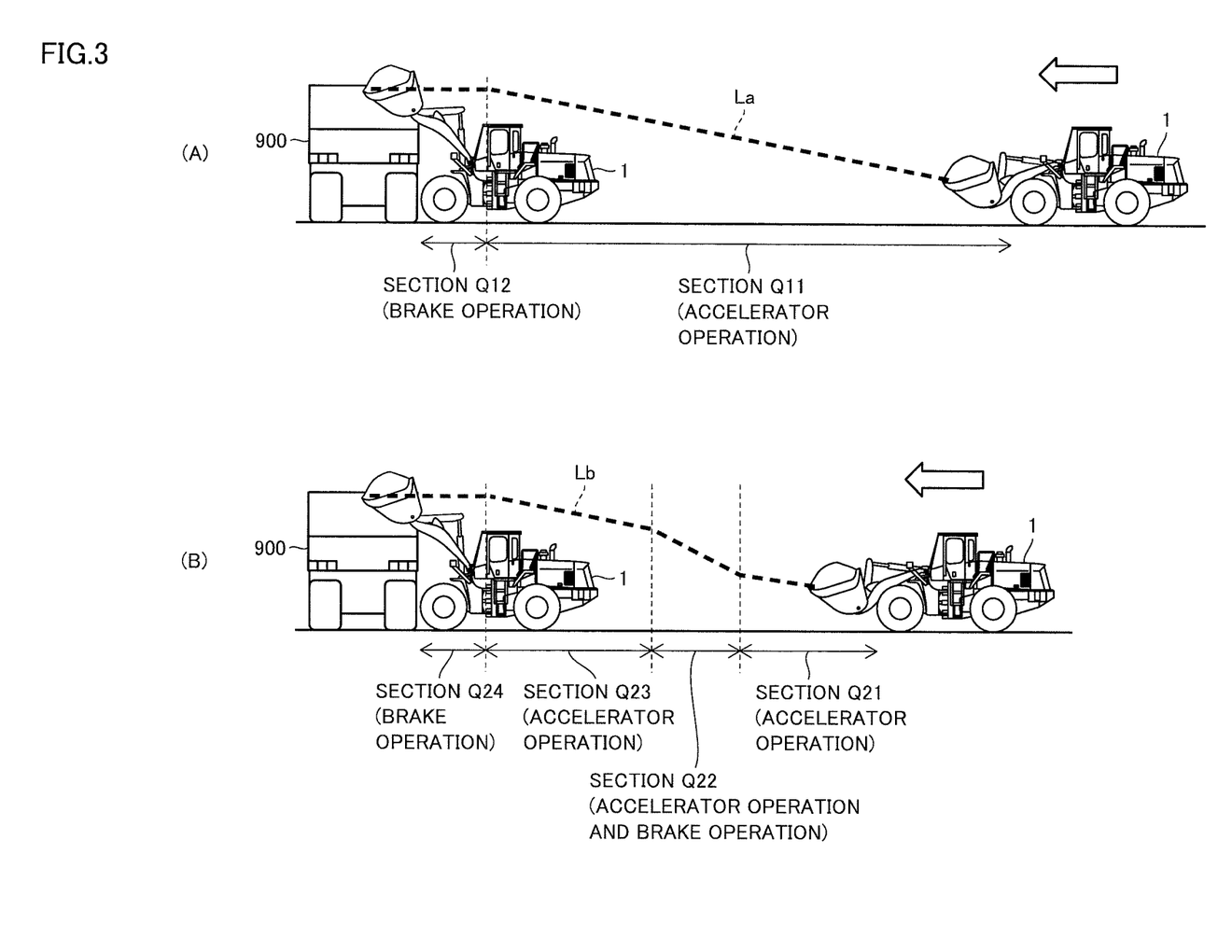
FIG. 3 is a schematic diagram illustrating an outline of dump approach.

FIG. 3 is a schematic diagram illustrating an outline of the dump approach. The dump approach means that wheel loader 1 approaches the dump truck while raising boom 106. In particular, the dump approach means a state in which wheel loader 1 advances to approach the dump truck while a boom lever is subjected to a boom-raising operation. Typically, the dump approach means that wheel loader 1 advances to approach the dump truck at the second speed gear while boom control lever 71a is subjected to the boom-raising operation.

In the following description, for convenience, when the boom 106 is raised, the description will be given on the assumption that a boom-raising speed is kept constant.

FIG. 3(A) is a view illustrating an operator's operation in the case where a distance between the wheel loader and the dump truck is sufficiently secured. As illustrated in FIG. 3(A), the operator performs an accelerator operation in a section Q11. Specifically, the operator presses down on accelerator pedal 31. In section Q11, the operator also operates boom control lever 71a in order to raise boom 106. Consequently, in section Q11, the boom-raising operation is performed while wheel loader 1 travels toward dump truck 900.

The reason why the operator operates the accelerator operation in section Q11 is to sufficiently supply the hydraulic pressure to lift cylinders 114a, 114b, rather than to cause wheel loader 1 to travel. The engine rotation speed is increased to ensure the output of hydraulic oil from the hydraulic pump. Thus, even if the operator presses down on the brake pedal in order to slow down the vehicle speed in section Q11, the operator presses continuously down on the accelerator pedal.

In a section Q12 subsequent to section Q11, the operator stops the accelerator operation, and performs the brake operation. Specifically, the operator stops to press down on accelerator pedal 31 and presses down on brake pedal 75. Consequently, the operator stops wheel loader 1 before dump truck 900. Thereafter, the operator operates the bucket control lever 72a to load the soil scooped by the bucket 107 onto the cargo box of the dump truck 900.

In the case where the series of operations is performed, a passing trajectory of bucket 107 is typically represented by a broken line La.

FIG. 3(B) is a view illustrating an operator's operation in the case where the distance between the wheel loader and the dump truck is insufficiently secured. As illustrated in FIG. 3(B), in a section Q21, the operator performs the accelerator operation without performing the brake operation. In section Q21, the operator operates boom control lever 71a in order to raise boom 106. Consequently, in section Q21, the boom-raising operation is performed while wheel loader 1 travels toward dump truck 900.

In a section Q22 subsequent to section Q21, the operator performs the brake operation together with the accelerator operation. Specifically, the operator presses simultaneously down on accelerator pedal 31 and brake pedal 75. Consequently, boom 106 is raised at the same boom-raising speed as section Q21 while a forward speed of wheel loader 1 is reduced.

In consideration of the distance between wheel loader 1 and dump truck 900 and the position of bucket 107, the operator stops the brake operation and performs only the accelerator operation (section Q23).

In a section Q24 subsequent to section Q23, the operator stops the accelerator operation and performs the brake operation to stop wheel loader 1 before dump truck 900. Thereafter, the operator operates the bucket control lever 72a to load the soil scooped by the bucket 107 onto the cargo box of the dump truck 900.

In the case where the series of operations is performed, the passing trajectory of bucket 107 is typically represented by a broken line Lb.

In the embodiment, although described in detail later, wheel loader 1 controls a change of the hydraulic pressure of the hydraulic oil supplied to forward clutch 55 in section Q22.

D. CLUTCH HYDRAULIC PRESSURE CONTROL DURING DUMP APPROACH

Hereinafter, hydraulic pressure control of the hydraulic oil supplied to forward clutch 55, which is performed during the dump approach, will be described below with a specific example. In particular, a method for changing the hydraulic pressure of forward clutch 55, which is performed in section Q22 of FIG. 3, will be described. Hereinafter, the hydraulic pressure of hydraulic oil supplied to forward clutch 55 is also referred to as "hydraulic pressure of forward clutch 55".

Figure 4:
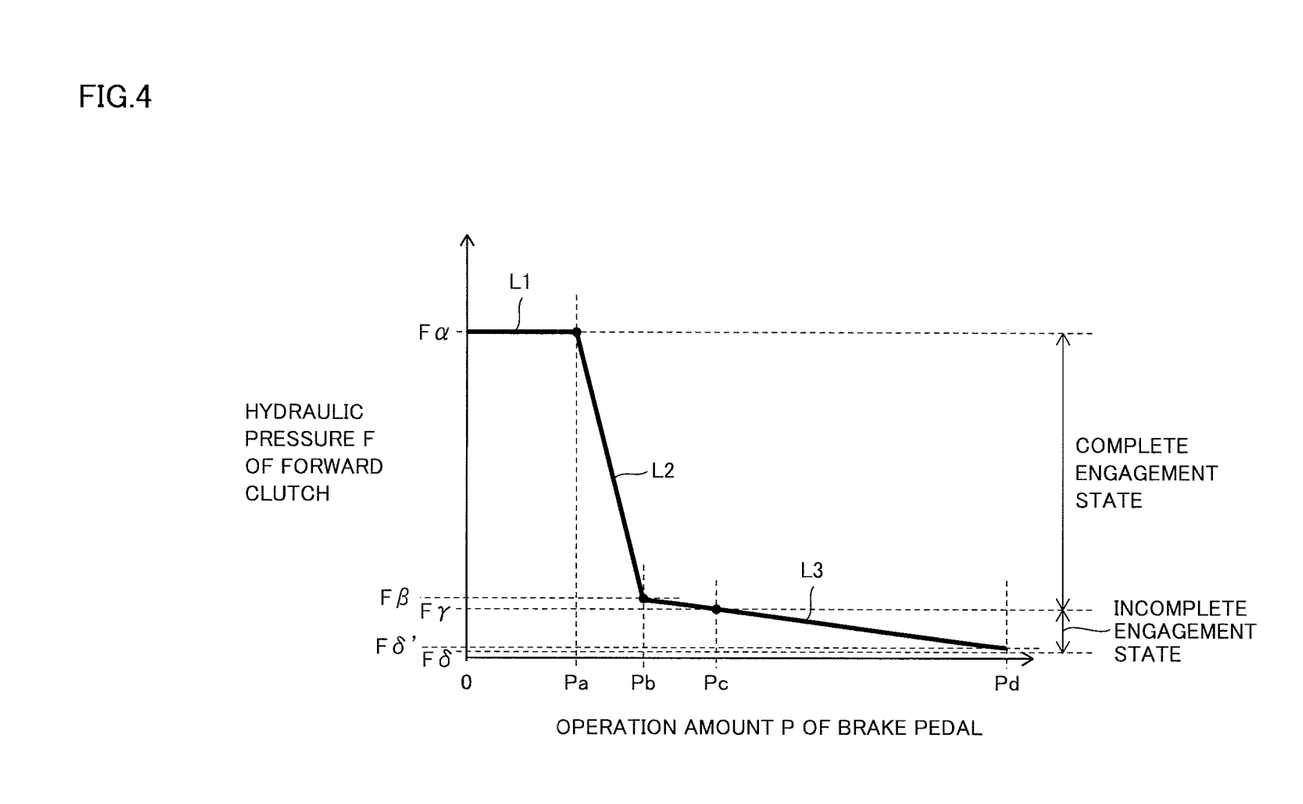
FIG. 4 is a view illustrating a relationship between an operation amount of a brake pedal and hydraulic pressure of a forward clutch.

FIG. 4 is a view illustrating a relationship between an operation amount P of brake pedal 75 and hydraulic pressure F of forward clutch 55. During the dump approach, controller 30 of wheel loader 1 controls hydraulic pressure F of forward clutch 55 according to the relationship between operation amount P and hydraulic pressure F illustrated in a graph (line segments L1, L2, L3) of FIG. 4. Operation amount P corresponds to the pressing operation amount of brake pedal 75 output from brake operation amount sensor 76.

In the case where operation amount P of brake pedal 75 is less than or equal to an operation amount Pa, typically, controller 30 controls hydraulic pressure F of forward clutch 55 such that hydraulic pressure F becomes equal to hydraulic pressure F$\alpha$ of forward clutch 55 immediately before the operation of brake pedal 75. Specifically, controller 30 controls hydraulic pressure F of forward clutch 55 along line segment L1.

When operation amount P of brake pedal 75 exceeds operation amount Pa, controller 30 starts control for reducing hydraulic pressure F of forward clutch 55 according to operation amount P. Typically, controller 30 reduces hydraulic pressure F of forward clutch 55 at a constant ratio K$\alpha$ (a slope of line segment L2) per unit operation amount until operation amount P becomes an operation amount Pb. Specifically, controller 30 controls hydraulic pressure F of forward clutch 55 along line segment L2.

Hydraulic pressure F of forward clutch 55 becomes hydraulic pressure F$\beta$ at operation amount Pb (Pb>Pa). Even if hydraulic pressure F of forward clutch 55 is reduced to hydraulic pressure F$\beta$, forward clutch 55 maintains a complete engagement state.

When operation amount P of brake pedal 75 exceeds operation amount Pb, controller 30 further reduces hydraulic pressure F of forward clutch 55 at a constant ratio K$\beta$ (a slope of line segment L3) having a rate of change lower than that of ratio K$\alpha$. Specifically, controller 30 controls hydraulic pressure F of forward clutch 55 along line segment L3. In this way, when operation amount P exceeds operation amount Pb, controller 30 decreases a change amount of hydraulic pressure F of forward clutch 55 to a unit change amount of operation amount P of brake pedal 75 as compared with operation amount P between operation amount Pa and operation amount Pb.

When operation amount P of brake pedal 75 reaches an operation amount Pc (Pc>Pb), forward clutch 55 shifts from the complete engagement state to an incomplete engagement state. In FIG. 4, hydraulic pressure F of forward clutch 55 at this time is expressed as Fγ (Fγ<Fβ).

When operation amount P of brake pedal 75 reaches a maximum operation amount Pd (Pd>Pc), a value of hydraulic pressure F of forward clutch 55 becomes a value Fδ' (Fδ'>Fδ) that is slightly larger than a value Fδ (Fδ>0).

In this way, forward clutch 55 becomes the complete engagement state when the value of hydraulic pressure F of forward clutch 55 ranges from Fγ to Fα, and forward clutch 55 becomes a semi-engagement state when the value of hydraulic pressure F ranges from Fγ to Fδ. When operation amount P becomes Fδ or less, the forward clutch becomes a disengaged state (neutral state).

In particular, Fβ is a value obtained by adding α1 (α1 is a constant) to Fγ, and Fδ' is a value obtained by adding α2 (α2 is a constant) to Fδ. Controller 30 automatically sets Fγ to calculate Fβ. Fδ' may be a predetermined value.

When hydraulic pressure F is Fr, hydraulic pressure F and operation amount P are set to values defined by line segment L3, so that a shock is hardly generated in vehicular body 102. When hydraulic pressure F is Fδ', the vehicle speed is easily adjusted when forward clutch 55 is certainly in the incomplete engagement state.

Although it is different from the above setting, "Fβ=Fγ" and "Fδ=Fδ'" can also be set.

Hereinafter, for convenience, a control mode of the hydraulic pressure of forward clutch 55 during operation amount P of brake pedal 75 between Pa and Pb is also referred to as a "first mode". A control mode of the hydraulic pressure of forward clutch 55 during the operation amount P of brake pedal 75 between Pb and Pd is also referred to as a "second mode".

Figure 5:
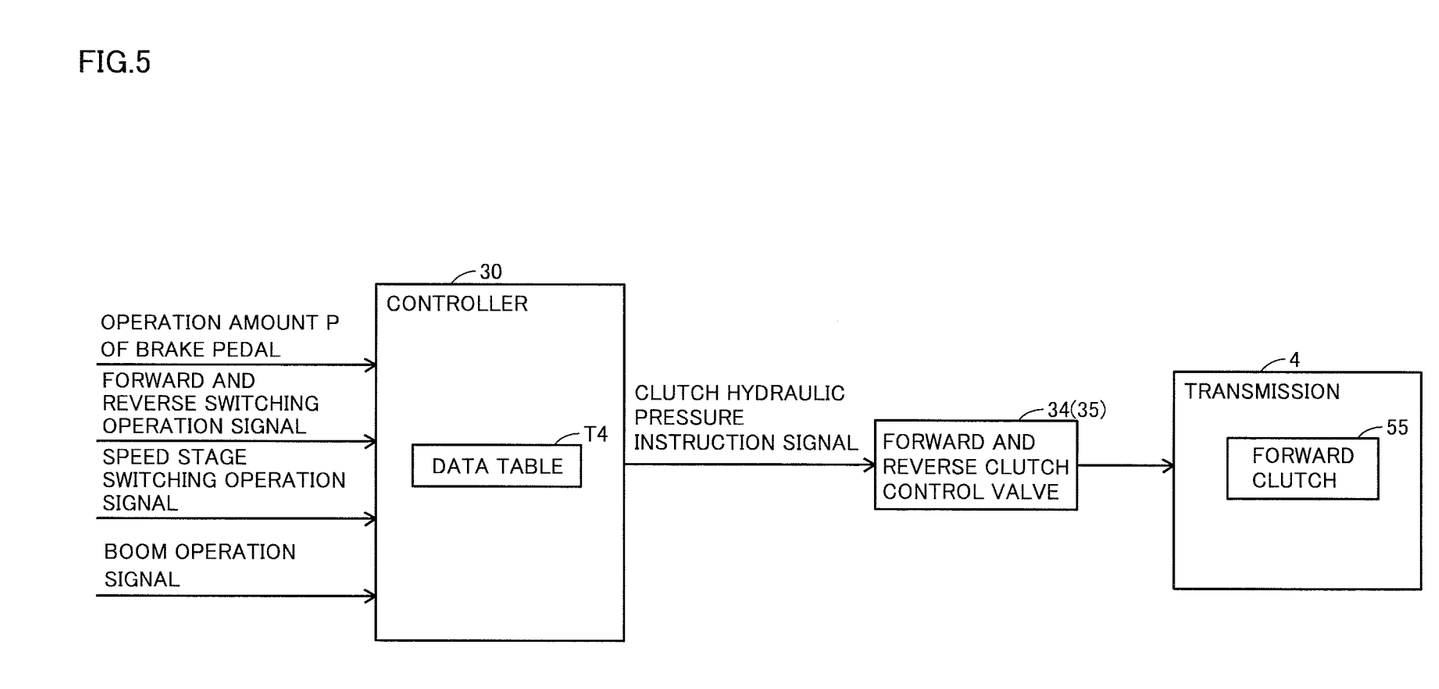
FIG. 5 is a view illustrating a specific configuration that performs clutch hydraulic pressure control described with reference to FIG. 4.

FIG. 5 is a view illustrating a specific configuration that performs the clutch hydraulic pressure control described with reference to FIG. 4.

As illustrated in FIG. 5, controller 30 stores a data table T4. The relationship between operation amount P and hydraulic pressure F in FIG. 4 is defined in data table T4. In data table T4, the value of hydraulic pressure F of forward clutch 55 is correlated with operation amount P of brake pedal 75.

In particular, hydraulic pressure F of forward clutch 55 is decided by a current value A of the clutch hydraulic pressure instruction signal transmitted from controller 30 to forward and reverse clutch control valves 34, 35. For this reason, a correspondence relationship among operation amount P, hydraulic pressure F, and the current value A of the clutch hydraulic pressure instruction signal is defined in data table T4.

Data table T4 is generated based on a reference input and output characteristic (the relationship between current value A and hydraulic pressure F) of the forward and reverse clutch control valves 34, 35. Typically, data table T4 is generated based on performance and specifications of forward and reverse clutch control valves 34, 35 of the forward and reverse clutch control valves 34, 35.

Controller 30 determines whether the dump approach is being performed based on the forward and reverse switching operation signal, the speed change switching operation signal, and the boom operation signal. Typically, when the speed change stage is located in the second speed gear and when wheel loader 1 advances while the boom is raised, the controller 30 determines that wheel loader 1 is in the dump approach state.

When determining that the dump approach is being performed, controller 30 determines the value of operation amount P of brake pedal 75. Controller 30 refers to data table T4 to generate a clutch hydraulic pressure instruction signal of current value A correlated with operation amount P. Controller 30 transmits the generated clutch hydraulic pressure instruction signal to forward and reverse clutch control valves 34, 35.

Consequently, the hydraulic oil is supplied to forward clutch 55 in transmission 4, and hydraulic pressure F of forward clutch 55 becomes the value correlated with operation amount P.

As described above, when brake pedal 75 is operated during the dump approach, controller 30 starts the control for reducing hydraulic pressure F of forward clutch 55. In particular, by increasing the operation amount P of the brake pedal 75, the operator can cause forward clutch 55 to shift from the complete engagement state to the semi-engagement state.

When forward clutch 55 is in the semi-engagement state during the dump approach, passing torque passing through forward clutch 55 decreases. Tractive force of wheel loader 1 also decreases. Thus, in wheel loader 1, a degree of dragging of the brake can be decreased as compared with the case where the hydraulic pressure of forward clutch 55 is not reduced to the semi-engagement state. As a result, the wheel loader 1 can reduce wear of a brake pad of service brake 40 as well as fuel consumption of wheel loader 1 as compared with the case where the hydraulic pressure of forward clutch 55 is not reduced to the semi-engagement state.

Forward clutch 55 is in the complete engagement state between operation amount Pa and operation amount Pb in FIG. 4, so that the change in hydraulic pressure of forward clutch 55 does not affect the operator's operation. Consequently, the change amount (ratio Kα) of hydraulic pressure F of forward clutch 55 to the unit change amount of operation amount P of brake pedal 75 between operation amount Pb and operation amount Pd is set larger than the change amount (ratio Kβ) between operation amount Pb and operation amount Pd, which allows the hydraulic pressure of forward clutch 55 to be quickly decreased to hydraulic pressure Fβ immediately before the semi-engagement state of forward clutch 55.

As illustrated in FIG. 4, immediately before forward clutch 55 is brought into the semi-engagement state, controller 30 decreases the change amount (reduction amount) of hydraulic pressure F of forward clutch 55 to the unit change amount of operation amount P of brake pedal 75.

As described above, immediately after operation amount P of brake pedal 75 exceeds operation amount Pb, forward clutch 55 shifts from the complete engagement state to the semi-engagement state. For this reason, when operation amount P exceeds operation amount Pb, the change in hydraulic pressure of forward clutch 55 affects the operator's operation. In particular, as operation amount P of brake pedal 75 increases, a degree of slippage of forward clutch 55 increases, so that the change in hydraulic pressure of forward clutch 55 affects the operator's operation.

Consequently, the change amount of hydraulic pressure F of forward clutch 55 to the unit change amount of operation amount P of brake pedal 75 is decreased immediately before forward clutch 55 becomes the semi-engagement state, which allows the operator to finely adjust the forward speed of wheel loader 1 as compared with a configuration in which the change amount is not changed.

During the clutch hydraulic pressure control, controller 30 can determine whether the clutch is in the semi-engagement state or the complete engagement state based on the passing torque of the clutch.

In particular, controller 30 can determine whether forward clutch 55 is in the semi-engagement state or the complete engagement state based on the detection value of transmission input shaft rotation speed sensor 45 (first rotation speed sensor) that detects the rotation speed of the input shaft of the transmission 4 including forward clutch 55 and the detection value of the transmission output shaft rotation speed sensor 47 (second rotation speed sensor) that detects the rotation speed of the output shaft of transmission 4.

More particularly, controller 30 estimates the rotation speed of the output shaft from the detection value of transmission input shaft rotation speed sensor 45. Controller 30 calculates a difference between the estimated rotation speed and the detection value of transmission output shaft rotation speed sensor 47. When the calculated difference is greater than or equal to a predetermined threshold, controller 30 determines that forward clutch 55 becomes the semi-engagement state.

The description is made as follows by focusing on the clutch hydraulic pressure instruction signal. On a condition that a signal in which the operation amount of accelerator pedal 31 is greater than or equal to a first predetermined value and a signal in which the operation amount of brake pedal 75 is greater than or equal to a second predetermined value are simultaneously input, controller 30 outputs the clutch hydraulic pressure instruction signal reducing the hydraulic pressure of forward clutch 55 to forward and reverse clutch control valves 34, 35 that controls the hydraulic pressure of the hydraulic oil of forward clutch 55 according to the operation amount of brake pedal 75 and the pressure of the brake hydraulic oil. Even after forward clutch 55 shifts from the complete engagement state to the semi-engagement state, controller 30 continuously outputs the clutch hydraulic pressure instruction signal reducing the hydraulic pressure of forward clutch 55 to forward and reverse clutch control valves 34, 35.

The first predetermined value is a threshold used by controller 30 to check whether the operator presses down on accelerator pedal 31. The second predetermined value is a threshold used by controller 30 to check whether the operator presses down on brake pedal 75. The third predetermined value is a threshold used by controller 30 to check whether service brake 40 is applied. Controller 30 is an example of the "wheel loader control system".

E. CONTROL STRUCTURE

Figure 6:
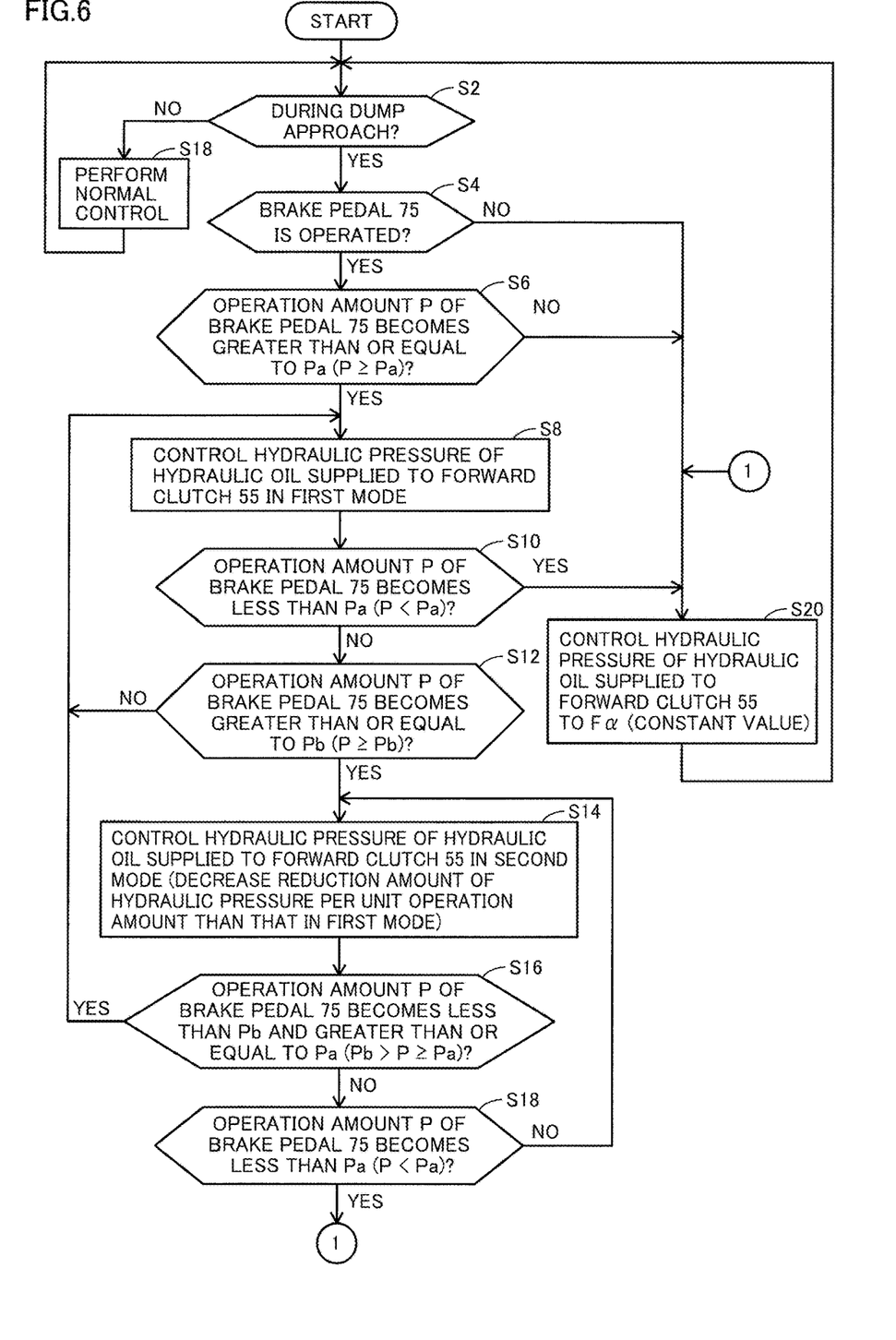
FIG. 6 is a flowchart illustrating a process for hydraulic pressure control of the forward clutch of the wheel loader.

FIG. 6 is a flowchart illustrating a process for the hydraulic pressure control of forward clutch 55 of wheel loader 1. As illustrated in FIG. 6, in step S2, controller 30 determines whether the current action state is in the dump approach. When determining that the dump approach is not being performed (NO in step S2), controller 30 continuously performs normal control on forward clutch 55 in step S18.

When determining that the dump approach is being performed (YES in step S2), controller 30 determines whether brake pedal 75 is operated in step S4. When determining that brake pedal 75 is operated (YES in step S4), controller 30 determines whether operation amount P of brake pedal 75 becomes greater than or equal to Pa in step S6. When determining that brake pedal 75 is not operated (NO in step S4), controller 30 controls the hydraulic pressure of forward clutch 55 to Fα (constant value) in step S20.

After step S20, controller 30 returns the process to step S2. Then, when determining that the dump approach is not performed in step S2 (NO in step S2), controller 30 stops the clutch hydraulic pressure control for reducing the hydraulic pressure of forward clutch 55 according to operation amount P, and returns the control to the normal control (step S18).

When determining that operation amount P is greater than or equal to Pa (YES in step S6), controller 30 controls the hydraulic pressure of forward clutch 55 in the first mode in step S8. Specifically, controller 30 reduces the hydraulic pressure of forward clutch 55 at constant ratio Kα per unit operation amount. When determining that operation amount P is less than Pa (NO in step S6), controller 30 advances the process to step S20.

In step S10, the controller 30 determines whether operation amount P of brake pedal 75 becomes less than Pa. When determining that the operation amount P is less than Pa (YES in step S10), controller 30 advances the process to step S20. When determining that operation amount P of brake pedal 75 is not less than Pa (NO in step S10), controller 30 determines whether operation amount P of brake pedal 75 becomes greater than or equal to Pb in step S12.

When determining that operation amount P is greater than or equal to Pb (YES in step S12), controller 30 controls the hydraulic pressure of forward clutch 55 in the second mode in step S14. Specifically, controller 30 reduces the hydraulic pressure of forward clutch 55 at constant ratio Kβ per unit operation amount. When determining that operation amount P is less than Pb, controller 30 advances the process to step S8.

In step S16, controller 30 determines whether operation amount P of brake pedal 75 becomes less than Pb and becomes greater than or equal to Pa. When determining that operation amount P is less than Pb and is greater than or equal to Pa (YES in step S16), controller 30 advances the process to step S8. When determining that operation amount P of brake pedal 75 is not in a range of less than Pb and greater than or equal to Pa (NO in step S16), controller 30 determines whether operation amount P of brake pedal 75 becomes less than Pa in step S18.

When determining that operation amount P becomes less than Pa (YES in step S18), controller 30 advances the process to step S20. When determining that operation amount P of brake pedal 75 is not less than Pa (NO in step S18), controller 30 advances the process to step S14.

F. SUMMARY (1) Wheel loader 1 includes forward clutch 55, accelerator pedal 31, brake pedal 75 that operates hydraulic service brake 40, and controller 30 that controls the hydraulic pressure of forward clutch 55 (particularly, the hydraulic pressure of the hydraulic oil supplied to forward clutch 55).

On the condition that brake pedal 75 is operated while at least accelerator pedal 31 is being operated, controller 30 performs the clutch hydraulic pressure control for reducing the hydraulic pressure of forward clutch 55 according to the operation amount of brake pedal 75 as illustrated in FIG. 4. In particular, on the condition that wheel loader 1 advances to approach dump truck 900 and that boom control lever 71a receives the boom-raising operation (condition that the dump approach is being performed), controller 30 starts the clutch hydraulic pressure control for reducing the hydraulic pressure of forward clutch 55 according to the operation amount of brake pedal 75. Controller 30 continuously performs the clutch hydraulic pressure control even after forward clutch 55 shifts from the complete engagement state to the semi-engagement state by the clutch hydraulic pressure control.

When forward clutch 55 is in the semi-engagement state during the dump approach, passing torque passing through forward clutch 55 decreases. Tractive force of wheel loader 1 also decreases. Thus, in wheel loader 1, a degree of dragging of the brake can be decreased as compared with the case where the hydraulic pressure of forward clutch 55 is not reduced to the semi-engagement state. As a result, the wheel loader 1 can reduce wear of a brake pad of service brake 40 as well as fuel consumption of wheel loader 1 as compared with the case where the hydraulic pressure of forward clutch 55 is not reduced to the semi-engagement state.

(2) According to the operation amount of brake pedal 75, controller 30 continuously changes the hydraulic pressure of forward clutch 55 as illustrated in FIG. 4. By continuously changing the hydraulic pressure in this way, the operator can finely adjust the forward speed of wheel loader 1 as compared with a configuration in which the hydraulic pressure is not continuously changed.

(3) When forward clutch 55 is in the semi-engagement state, controller 30 decreases the change amount of the hydraulic pressure of forward clutch 55 to the unit change amount of operation amount P of brake pedal 75 as compared with the case where forward clutch 55 is in the complete engagement state (in particular hydraulic pressure F of forward clutch 55 has the value between Fα and Fβ). According to this configuration, the operator can finely adjust the forward speed of wheel loader 1 as compared with the configuration in which the change amount of hydraulic pressure F of forward clutch 55 to the unit change amount of operation amount P is not decreased.

(4) When forward clutch 55 is in the semi-engagement state, controller 30 keeps constant the ratio of the change amount of the hydraulic pressure of forward clutch 55 to the unit change amount of operation amount P of brake pedal 75. According to this configuration, the operator can finely adjust the forward speed of wheel loader 1 as compared with the configuration in which the ratio of the change amount of hydraulic pressure F of forward clutch 55 to the unit change amount of operation amount P is not kept constant.

(5) As described above, wheel loader 1 performs the clutch hydraulic pressure control for reducing the hydraulic pressure of forward clutch 55 according to the operation amount of brake pedal 75. Wheel loader 1 having the above configuration has the following advantages as compared with a configuration (hereinafter also referred to as a "transmission cut-off function") in which forward clutch 55 is set to the disengaged state (neutral state) when the operation amount of brake pedal 75 exceeds the threshold.

In wheel loader 1, the change amount per unit time of the hydraulic pressure of forward clutch 55 is decreased as compared with the configuration having the transmission cut-off function. Consequently, wheel loader 1 can reduce the shock generated in vehicular body 102 as compared with the configuration having the transmission cut-off function.

Wheel loader 1 can easily adjust the vehicle speed of wheel loader 1 during the dump approach as compared with the configuration having the transmission cut-off function. Thus, wheel loader 1 can accurately perform the dump approach as compared with the configuration having the transmission cut-off function.

G. MODIFICATIONS (g1. Use of Pressure of Hydraulic Oil of Service Brake 40)

In the above embodiment, controller 30 performs the clutch hydraulic pressure control for reducing the hydraulic pressure of forward clutch 55 according to the operation amount of brake pedal 75 on condition that the dump approach is being performed.

However, the present invention is not limited to the embodiment. Alternatively, controller 30 may reduce the hydraulic pressure of forward clutch 55 according to the pressure of the hydraulic oil of service brake 40 on the condition that the dump approach is being performed. The pressure of the hydraulic oil of service brake 40 is detected by pressure sensor 7.

With this configuration, similarly to the case where the hydraulic pressure of forward clutch 55 is reduced according to the operation amount of brake pedal 75, the wear of the brake pad of service brake 40 can be reduced and the fuel consumption of wheel loader 1 can be reduced.

In this way, the configuration that uses the pressure of the hydraulic oil of service brake 40 instead of the operation amount of brake pedal 75 can also be applied to each of modifications (g2) to (g8) described later.

(g2. Application to Speed Stage Clutch)

In the above embodiment, controller 30 performs the clutch hydraulic pressure control for reducing the hydraulic pressure of forward clutch 55 according to the operation amount of brake pedal 75 on condition that the dump approach is being performed.

However, the present invention is not limited to the embodiment. Alternatively, controller 30 may reduce the hydraulic pressure of speed stage clutches 51 to 54 according to the operation amount of brake pedal 75 on condition that the dump approach is being performed.

In particular, on the condition that the dump approach is being performed, controller 30 may reduce the hydraulic pressure of the speed stage clutch corresponding to the operation position of speed change lever 74a among speed stage clutches 51 to 54 according to the operation amount of brake pedal 75.

With this configuration, similarly to the case where the hydraulic pressure of forward clutch 55 is reduced according to the operation amount of brake pedal 75, the wear of the brake pad of service brake 40 can be reduced and the fuel consumption of wheel loader 1 can be reduced.

(g3. Correction of Current Value in Data Table T4)

Forward and reverse clutch control valves 34, 35 receive the clutch hydraulic pressure instruction signal from controller 30, and supply the hydraulic oil to forward clutch 55 such that the hydraulic pressure of forward clutch 55 becomes the hydraulic pressure corresponding to the current value of the clutch hydraulic pressure instruction signal.

However, sometimes forward and reverse clutch control valves 34, 35 may have some errors with respect to the reference input and output characteristic. For this reason, controller 30 preferably corrects data table T4 in consideration of individual differences of forward and reverse clutch control valves 34, 35. The way of correcting data table T4 is as follows.

Controller 30 determines the hydraulic pressure of forward clutch 55 when forward clutch 55 is in the semi-engagement state during the clutch hydraulic pressure control for reducing the hydraulic pressure of forward clutch 55 according to the operation amount of brake pedal 75. Based on the determination result, controller 30 corrects the correspondence relationship between the current value of the clutch hydraulic pressure instruction signal in data table T4 and the operation amount of brake pedal 75. Consequently, the correspondence relationship between the hydraulic pressure of the hydraulic oil supplied to forward clutch 55 and the operation amount of brake pedal 75 is corrected.

In particular, controller 30 corrects the correspondence relationship between the current value of the clutch hydraulic pressure instruction signal in data table T4 and the operation amount of brake pedal 75 based on the passing torque of forward clutch 55 and the hydraulic pressure of forward clutch 55 when forward clutch 55 becomes the semi-engagement state of forward clutch 55.

A variation in performance of the forward and reverse clutch control valves 34, 35 can be dealt with by correcting data table T4 in this way.

(g4. Use of Angle Sensor 144)

Controller 30 performs the clutch hydraulic pressure control for reducing the hydraulic pressure of forward clutch 55 according to the operation amount of brake pedal 75 on condition that the inclination of vehicular body 102 is less than a predetermined angle.

In a sloping land such as a hill, the time during which forward clutch 55 and the like slide becomes long, so that a thermal load increases. However, according to the above configuration, when vehicular body 102 is inclined by a predetermined angle or more in the fore/aft direction of vehicular body 102 with respect to the reference surface such as the perpendicular direction and the horizontal direction, controller 30 does not perform the clutch hydraulic pressure control even if the condition of the dump approach is established. Thus, an increase in thermal load can be reduced in the sloping land.

Controller 30 can determine whether the vehicle is traveling on a sloping land based on whether the inclination of vehicular body 102 is greater than or equal to a predetermined angle. The inclination of the vehicular body can be determined based on the detection result of angle sensor 144.

(g5. Measures Against Heat Generation)

Forward clutch 55 is brought into the semi-engagement state during the dump approach, whereby the heat is generated in forward clutch 55. A configuration that prevents a heat generation amount will be described below.

Controller 30 monitors a use state of forward clutch 55. Specifically, controller 30 calculates a calorific value Q of forward clutch 55. Calorific value Q of forward clutch 55 can be calculated by the following equation (1) using a heat radiation amount R(t), a clutch heat generation rate q, and a clutch slipping time Δt.

[Mathematical Formula 1]

$$Q = \int R(t) \times q \times \Delta t \quad (1)$$

Clutch heat generation rate q can be calculated by the following equation (2).

Clutch heat generation rate $q$ = friction coefficient × relative rotation speed × clutch hydraulic pressure  (2)

In the equation (1), clutch slipping time Δt is time during which forward clutch 55 is in the semi-engagement state according to operation amount P of brake pedal 75. When forward clutch 55 is completely engaged or disengaged, clutch slipping time Δt returns to zero.

In the equation (2), the friction coefficient is a friction coefficient of a friction material of the clutch plate. The relative rotation speed is a difference between engine rotation speed Ne detected by the engine rotation speed sensor and pump impeller rotation speed Nc detected by the torque converter input rotation speed sensor. The relative rotation speed is a difference in rotation speed between the input side and the output side. The clutch hydraulic pressure is a surface pressure generated between clutch plates. The electronic control type proportional solenoid valve is used for the forward and reverse clutch control valves 34, 35, so that the clutch hydraulic pressure can be read from the clutch hydraulic pressure instruction signal transmitted from controller 30 to forward and reverse clutch control valves 34, 35.

Controller 30 determines whether calorific value Q is less than a threshold Qmax (fourth threshold). The clutch hydraulic pressure control for reducing the hydraulic pressure of forward clutch 55 according to the operation amount of brake pedal 75 is stopped when calorific value Q is greater than or equal to Qmax. Consequently, calorific value Q of forward clutch 55 can be reduced.

Alternatively, controller 30 may generate a control signal in order to cause an output device (a display apparatus or a speaker) to issue a predetermined notification for stopping the clutch hydraulic pressure control. According to this configuration, controller 30 can give the operator a trigger for reducing calorific value Q of forward clutch 55.

(g6. Restriction on Change Amount Per Unit Time of Hydraulic Pressure of Hydraulic Oil Supplied to Forward Clutch 55)

In the case where the operation amount per unit time of brake pedal 75 increases during the dump approach (for example, in the case where brake pedal 75 is suddenly pressed down on), there is a possibility that a large shock is generated in vehicular body 102. Accordingly, controller 30 may be configured as follows.

When brake pedal 75 is operated, controller 30 refers to data table T4 to determine whether the change amount per unit time of the hydraulic pressure of the hydraulic oil supplied to forward clutch 55 is greater than or equal to a predetermined threshold (second threshold). When determining that the change amount is greater than or equal to the predetermined threshold, controller 30 restricts the change amount per unit time of the hydraulic pressure of the hydraulic oil supplied to forward clutch 55 to a predetermined threshold. According to this configuration, a large shock can be prevented from being generated in vehicular body 102 even if brake pedal 75 is rapidly operated.

(g7. Restriction on Change Amount Per Unit Time of Current Value of Clutch Hydraulic Pressure Instruction Signal)

In the case where the operation amount per unit time of brake pedal 75 increases during the dump approach (for example, in the case where brake pedal 75 is suddenly pressed down on), there is a possibility that a large shock is generated in vehicular body 102. Accordingly, controller 30 may be configured as follows.

In the case where brake pedal 75 is operated, controller 30 determines whether the change amount per unit time of the current value in the clutch hydraulic pressure instruction signal transmitted to forward and reverse clutch control valves 34, 35 is greater than or equal to a predetermined threshold (third threshold). When determining that the change amount is greater than or equal to the predetermined threshold, controller 30 restricts the change amount per unit time of the hydraulic pressure of the hydraulic oil supplied to forward clutch 55 to the predetermined threshold. According to this configuration, a large shock can be prevented from being generated in vehicular body 102 even if brake pedal 75 is rapidly operated.

(g8. Starting Condition of Clutch Hydraulic Pressure Control)

The controller 30 may be configured to start the clutch hydraulic pressure control for reducing the hydraulic pressure of forward clutch 55 according to the operation amount of brake pedal 75 on condition that it is detected that bucket 107 holds the load of soil or the like having a predetermined weight or more in addition to the state in which the dump approach is being performed. For example, controller 30 can determine whether bucket 107 holds the load of the soil or the like having the predetermined weight or more based on whether a bottom pressure (hydraulic pressure) of lift cylinders 114a, 114b is greater than or equal to a predetermined value.

H. APPENDIX

The wheel loader includes the forward clutch or speed stage clutch, the accelerator pedal, the brake pedal that operates the hydraulic brake, and the controller that controls the hydraulic pressure of the hydraulic oil supplied to the clutch. The controller performs clutch hydraulic pressure control for reducing the hydraulic pressure of the hydraulic oil supplied to the clutch according to one of an operation amount of the brake pedal and pressure of the hydraulic oil of the brake on condition that the brake pedal is operated while at least the accelerator pedal is being operated. The controller continues the clutch hydraulic pressure control even after the clutch shifts from a complete engagement state to a semi-engagement state by the clutch hydraulic pressure control.

According to the above configuration, the degree of dragging of the brake can be decreased as compared with the case where the hydraulic pressure of the clutch is not reduced to the semi-engagement state. Consequently, the wheel loader can reduce the wear of the brake pad and the fuel consumption as compared with the case where the hydraulic pressure of the clutch is not reduced to the semi-engagement state. As described above, according to the wheel loader, the operation efficiency can be improved when the brake pedal is operated while the accelerator pedal is being operated.

Preferably, the controller continuously changes the hydraulic pressure of the hydraulic oil supplied to the clutch according to one of the operation amount of the brake pedal and the pressure of the hydraulic oil of the brake.

According to the above configuration, the operator can finely adjust the speed of the wheel loader as compared with the configuration in which the hydraulic pressure of the hydraulic oil supplied to the clutch is not continuously changed.

Preferably, the controller performs the clutch hydraulic pressure control on the condition that the wheel loader advances.

According to the above configuration, the operator can finely adjust the forward speed of the wheel loader during the dump approach.

Preferably, the wheel loader further includes the boom lever. The controller performs the clutch hydraulic pressure control on condition that the boom lever receives a boom-raising operation while the wheel loader advances.

According to the above configuration, the operation efficiency can be improved during the dump approach.

Preferably, the controller stops the clutch hydraulic pressure control when the wheel loader ends the advancement.

According to the above configuration, the hydraulic pressure of the clutch can be returned to the value before the start of the clutch hydraulic pressure control when the wheel loader ends the advancement.

Preferably, the wheel loader further includes the vehicular body and the sensor that detects the inclination of the vehicular body. The controller performs the clutch hydraulic pressure control on condition that the inclination of the vehicular body is less than the predetermined angle.

According to the above configuration, the increase of the heat generation amount of the clutch can be reduced in the sloping land.

Preferably, the controller determines the hydraulic pressure of the hydraulic oil supplied to the clutch when the clutch becomes the semi-engagement state during clutch hydraulic pressure control. Based on the determination result, the controller corrects the correspondence relationship between the hydraulic pressure of the hydraulic oil supplied to the clutch and one of the operation amount of the brake pedal and the pressure of hydraulic oil of the brake.

According to the above configuration, the variation in performance of the control valve that controls the clutch can be dealt with.

Preferably, during the clutch hydraulic pressure control, the controller determines whether the clutch is in the semi-engagement state or the complete engagement state based on the passing torque of the clutch.

According to the above configuration, whether the clutch is in the semi-engagement state or the complete engagement state can be determined.

Preferably, the wheel loader further includes the first rotation speed sensor that detects the rotation speed of the input shaft of the transmission including the clutch and the second rotation speed sensor that detects the rotation speed of the output shaft of the transmission. Based on the detection value of the first rotation speed sensor and the detection value of the second rotation speed sensor, the controller determines whether the clutch is in the semi-engagement state or the complete engagement state.

According to the above configuration, whether the clutch is in the semi-engagement state or the complete engagement state can be determined.

Preferably, the controller estimates the rotation speed of the output shaft from the detection value of the first rotation speed sensor. The controller calculates the difference between the estimated rotation speed and the detection value of the second rotation speed sensor. When the calculated difference becomes the first threshold, the controller determines that the clutch becomes the semi-engagement state.

According to the above configuration, the determination that the clutch is in the semi-engagement state can be made.

Preferably, in the case where the brake pedal is operated, the controller determines whether the change amount per unit time of the hydraulic pressure of the hydraulic oil supplied to the clutch is greater than or equal to the second threshold. When determining that the change amount is greater than or equal to the second threshold, the controller restricts the change amount per unit time of the hydraulic pressure of the hydraulic oil supplied to the clutch to the second threshold.

According to the above configuration, a large shock can be prevented from being generated in the vehicular body of the wheel loader even if the brake pedal is suddenly operated.

Preferably, the wheel loader further includes the clutch control valve that adjusts the hydraulic pressure of the hydraulic oil supplied to the clutch based on the current value of the hydraulic pressure instruction signal received from the controller. The controller determines whether the change amount per unit time of the current value in the hydraulic pressure instruction signal transmitted to the clutch control valve is greater than or equal to the third threshold. When determining that the change amount is greater than or equal to the third threshold, the controller restricts the change amount per unit time of the hydraulic pressure of the hydraulic oil supplied to the clutch to the third threshold.

According to the above configuration, a large shock can be prevented from being generated on the vehicular body of the wheel loader.

Preferably, the controller calculates the calorific value of the clutch while performing the clutch hydraulic pressure control. The controller performs at least one of the predetermined notification process and the stop of the clutch hydraulic pressure control when the calculated calorific value is greater than or equal to the fourth threshold.

According to the above configuration, the calorific value of the clutch can be reduced.

Preferably, in a semi-engagement state, the controller decreases the change amount of the hydraulic pressure of the hydraulic oil supplied to the clutch to the unit change amount of the operation amount of the brake pedal or the unit change amount of the pressure of the hydraulic oil of the brake as compared with the complete engagement state.

According to the above configuration, the operator can finely adjust the speed of the wheel loader as compared with the configuration in which the change amount of the hydraulic pressure of the clutch to the unit change amount of the operation amount of the brake pedal is not decreased.

Preferably, in the semi-engagement state, the controller keeps constant the ratio of the change amount of the hydraulic pressure of the hydraulic oil supplied to the clutch to the unit change amount of the operation amount of the brake pedal or the unit change amount of the pressure of the hydraulic oil of the brake.

According to the above configuration, the operator can finely adjust the speed of the wheel loader as compared with the configuration in which the ratio of the change amount of the hydraulic pressure of the clutch to the unit change amount of the operation amount of the brake pedal is not kept constant.

A method for controlling the wheel loader includes the steps of: determining that a brake pedal that operates a hydraulic brake is operated while an accelerator pedal is being operated; performing the clutch hydraulic pressure control for reducing the hydraulic pressure of hydraulic oil supplied to at least the forward or speed stage clutch according to the operation amount of the brake pedal or the pressure of the hydraulic oil of the brake based on the determination that the brake pedal is operated; and continuing the clutch hydraulic pressure control even after the clutch shifts from the complete engagement state to the semi-engagement state by the clutch hydraulic pressure control.

According to the above method, the degree of dragging of the brake can be decreased as compared with the case where the hydraulic pressure of the clutch is not reduced to the semi-engagement state. Consequently, the wheel loader can reduce the wear of the brake pad and the fuel consumption as compared with the case where the hydraulic pressure of the clutch is not reduced to the semi-engagement state.

A system for controlling a wheel loader outputs an instruction signal reducing the hydraulic pressure of the clutch to the control valve that controls the hydraulic pressure of the hydraulic oil of a forward or speed stage clutch according to the operation amount of the brake pedal and the pressure of the hydraulic oil of the brake on the condition that the signal in which the operation amount of the accelerator pedal is greater than or equal to the first predetermined value, and one of the signal in which the operation amount of the brake pedal is greater than or equal to the second predetermined value and the signal in which the pressure of the hydraulic oil of the brake is greater than or equal to the third predetermined value are simultaneously input. The system for controlling a wheel loader continuously outputs the instruction signal reducing the hydraulic pressure of the clutch to the control valve even after the clutch shifts from the complete engagement state to the semi-engagement state.

According to the above configuration, the degree of dragging of the brake can be decreased as compared with the case where the hydraulic pressure of the clutch is not reduced to the semi-engagement state. Consequently, the wheel loader can reduce the wear of the brake pad and the fuel consumption as compared with the case where the hydraulic pressure of the clutch is not reduced to the semi-engagement state.

The above embodiments are only by way of example, and the present invention is not limited to the above embodiment. The scope of the present invention is indicated by the claims, and it is intended that all modifications within the meaning and scope of the claims are included in the present invention.

REFERENCE SIGNS LIST

1: wheel loader, 2: engine, 3: torque converter, 4: transmission, 6: transfer, 7: pressure sensor, 8: hydraulic pump, 10: control unit, 11: pump impeller, 12: turbine runner, 13: stator, 14: lock-up clutch, 15: one-way clutch, 28: electronic control type fuel injector, 29: engine rotation speed sensor, 30: controller, 31: accelerator pedal, 32: accelerator operation amount sensor, 34, 35: forward and reverse clutch control valve, 36, 37, 38, 39: speed change clutch control valve, 40: service brake, 41a, 41b: hydraulic actuator, 42a, 42b: operation valve, 43: parking brake, 44: torque converter input rotation speed sensor, 45: transmission input shaft rotation speed sensor, 47: transmission output shaft rotation speed sensor, 48: brake control valve, 51, 52, 53, 54: speed stage clutch, 55: forward clutch, 56: reverse clutch, 71a: boom control lever, 71b: boom operation detector, 72a: bucket control lever, 72b: bucket operation detector, 73a: forward and reverse switching lever, 73b: forward and reverse switching detector, 74a: speed change lever, 74b: speed change detector, 75: brake pedal, 76: brake operation amount sensor, 90: driving force transmission path, 102: vehicular body, 102a: front vehicular body unit, 102b: rear vehicular body unit, 103: work implement, 104a: front wheel, 104b: rear wheel, 105: operator's cab, 106: boom, 107: bucket, 109: bell crank, 111a, 111b: steering cylinder, 114a, 114b: lift cylinder, 115: tilt cylinder, 116: boom pin, 117: bucket pin, 144: angle sensor, 900: dump truck, T4: data table

The invention claimed is:
1. A wheel loader comprising:
a forward or speed stage clutch;
an accelerator pedal;
a brake pedal configured to operate a hydraulic brake; and
a controller configured to control hydraulic pressure of hydraulic oil supplied to the clutch,
wherein the controller
performs clutch hydraulic pressure control for reducing the hydraulic pressure of the hydraulic oil supplied to the clutch according to one of an operation amount of the brake pedal and pressure of the hydraulic oil of the brake on condition that the brake pedal is operated while at least the accelerator pedal is being operated, and continues the clutch hydraulic pressure control even after the clutch shifts from a complete engagement state to a semi-engagement state by the clutch hydraulic pressure control.

2. The wheel loader according to claim 1, wherein the controller continuously changes the hydraulic pressure of the hydraulic oil supplied to the clutch according to one of the operation amount of the brake pedal and the pressure of hydraulic oil of the brake.

3. The wheel loader according to claim 1, wherein the controller performs the clutch hydraulic pressure control on condition that the wheel loader advances.

4. The wheel loader according to claim 3, further comprising a boom lever,
wherein the controller performs the clutch hydraulic pressure control on condition that the boom lever receives a boom-raising operation while the wheel loader advances.

5. The wheel loader according to claim 3, wherein the controller stops the clutch hydraulic pressure control when the wheel loader ends the advancement.

6. The wheel loader according to claim 1, further comprising:
a vehicular body; and
a sensor configured to detect inclination of the vehicular body,
wherein the controller performs the clutch hydraulic pressure control on condition that the inclination of the vehicular body is less than a predetermined angle.

7. The wheel loader according to claim 1, wherein the controller
determines the hydraulic pressure of the hydraulic oil supplied to the clutch when the clutch is in the semi-engagement state during the clutch hydraulic pressure control, and
corrects a correspondence relationship between the hydraulic pressure of the hydraulic oil supplied to the clutch and one of the operation amount of the brake pedal and the pressure of the hydraulic oil of the brake based on a result of the determination.

8. The wheel loader according to claim 7, wherein the controller
determines whether a change amount per unit time of the hydraulic pressure of the hydraulic oil supplied to the clutch is greater than or equal to a second threshold when the brake pedal is operated, and
restricts the change amount per unit time of the hydraulic pressure of the hydraulic oil supplied to the clutch to the second threshold when the change amount is determined to be greater than or equal to the second threshold.

9. The wheel loader according to claim 7, further comprising a clutch control valve configured to adjust the hydraulic pressure of the hydraulic oil supplied to the clutch based on a current value of a hydraulic pressure instruction signal received from the controller,
wherein the controller
determines whether a change amount per unit time of the current value in the hydraulic pressure instruction signal transmitted to the clutch control valve is greater than or equal to a third threshold, and
restricts the change amount per unit time of the hydraulic pressure of the hydraulic oil supplied to the clutch to the third threshold when the change amount is determined to be greater than or equal to the third threshold.

10. The wheel loader according to claim 1, wherein the controller determines whether the clutch is in the semi-engagement state or the complete engagement state based on passing torque of the clutch during the clutch hydraulic pressure control.

11. The wheel loader according to claim 1, further comprising:
a first rotation speed sensor configured to detect a rotation speed of an input shaft of a transmission including the clutch; and
a second rotation speed sensor configured to detect a rotation speed of an output shaft of the transmission,
wherein the controller determines whether the clutch is in the semi-engagement state or the complete engagement state based on a detection value of the first rotation speed sensor and a detection value of the second rotation speed sensor.

12. The wheel loader according to claim 11, wherein the controller
estimates the rotation speed of the output shaft from the detection value of the first rotation speed sensor,
calculates a difference between the estimated rotation speed and the detection value of the second rotation speed sensor, and
determines that the clutch becomes the semi-engagement state when the calculated difference becomes a first threshold.

13. The wheel loader according to claim 1, wherein the controller
calculates a calorific value of the clutch when the clutch hydraulic pressure control is being performed, and
performs at least one of a predetermined notification process and stop of the clutch hydraulic pressure control when the calculated calorific value is greater than or equal to a fourth threshold.

14. The wheel loader according to claim 1, wherein in the semi-engagement state, the controller decreases a change amount of the hydraulic pressure of the hydraulic oil supplied to the clutch with respect to a unit change amount of the operation amount of the brake pedal or a unit change amount of the pressure of the hydraulic oil of the brake as compared with the complete engagement state.

15. The wheel loader according to claim 14, wherein in the semi-engagement state, the controller keeps constant a ratio of the change amount of the hydraulic pressure of the hydraulic oil supplied to the clutch with respect to the unit change amount of the operation amount of the brake pedal or the unit change amount of the pressure of the hydraulic oil of the brake.

16. A method for controlling a wheel loader, comprising the steps of:
determining that a brake pedal configured to operate a hydraulic brake is operated while an accelerator pedal is being operated;
performing clutch hydraulic pressure control for reducing hydraulic pressure of hydraulic oil supplied to a forward or speed stage clutch according to an operation amount of the brake pedal or pressure of the hydraulic oil of the brake based on the determination that at least the brake pedal is operated; and continuing the clutch hydraulic pressure control even after the clutch shifts from a complete engagement state to a semi-engagement state by the clutch hydraulic pressure control.

17. A system for controlling a wheel loader, wherein
an instruction signal reducing hydraulic pressure of a clutch is output to a control valve configured to control hydraulic pressure of hydraulic oil of a forward or speed stage clutch according to an operation amount of a brake pedal or the pressure of the hydraulic oil of a brake on condition that a signal in which an operation amount of an accelerator pedal is greater than or equal to a first predetermined value, and one of a signal in which the operation amount of the brake pedal is greater than or equal to a second predetermined value and a signal in which the pressure of the hydraulic oil of the brake is greater than or equal to a third predetermined value are simultaneously input, and
the instruction signal reducing the hydraulic pressure of the clutch is continuously output to the control valve even after the clutch shifts from a complete engagement state to a semi-engagement state.

* * * * *